(12) United States Patent
Chang et al.

(10) Patent No.: US 11,705,781 B2
(45) Date of Patent: Jul. 18, 2023

(54) SYSTEM AND METHOD OF ACTIVE END-TURN COOLING FOR AN INTERIOR PERMANENT MAGNET MOTOR

(71) Applicant: GM Global Technology Operations LLC, Detroit, MI (US)

(72) Inventors: Insu Chang, Troy, MI (US); SeungHwan Keum, Northville, MI (US); Jun-mo Kang, Ann Arbor, MI (US); Young J. Kim, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/377,723

(22) Filed: Jul. 16, 2021

(65) Prior Publication Data
US 2023/0020219 A1    Jan. 19, 2023

(51) Int. Cl.
| | | |
|---|---|---|
| *H02K 9/19* | (2006.01) | |
| *H02K 1/20* | (2006.01) | |
| *H02K 5/20* | (2006.01) | |
| *H02K 9/193* | (2006.01) | |

(52) U.S. Cl.
CPC ............... *H02K 9/193* (2013.01); *H02K 1/20* (2013.01); *H02K 5/203* (2021.01)

(58) Field of Classification Search
CPC .............................. H02K 9/193; H02K 5/203
See application file for complete search history.

(56) References Cited

U.S. PATENT DOCUMENTS

| | | | | |
|---|---|---|---|---|
| 6,987,337 B2* | 1/2006 | Lowther | ................... | H02K 9/10 310/58 |
| 2010/0259118 A1* | 10/2010 | Kitagawa | ............... | H02K 11/25 310/54 |
| 2019/0044416 A1* | 2/2019 | Pydin | ..................... | B60K 25/08 |
| 2021/0328480 A1* | 10/2021 | Kosaka | .................. | H02K 1/148 |

FOREIGN PATENT DOCUMENTS

| | | |
|---|---|---|
| JP | 2008029170 A | 2/2008 |
| JP | 2019146376 A | 8/2019 |
| WO | 2020105467 A1* | 5/2020 ................... H02K 3/24 |

\* cited by examiner

*Primary Examiner* — Tulsidas C Patel
*Assistant Examiner* — Robert E Mates
(74) *Attorney, Agent, or Firm* — Vivacqua Crane PLLC

(57) ABSTRACT

A system and method of active endturn cooling of an electric motor of a vehicle is provided. The method comprises providing a motor having a coolant nozzle and a cam, and measuring speed, lateral acceleration, and road tilt angle of coolant due to road tilt. The method further comprises calculating coolant angle and coolant acceleration angle based on the road tilt angle and the lateral acceleration if the speed is greater than zero. The method further comprises comparing the coolant angle with a critical angle. The method further comprises calculating a first control angle and a first coolant distance based on the road tilt angle and the lateral acceleration of the vehicle if the acceleration angle is greater than the critical angle. The method further comprises determining a cam position based on the first control angle. The method further comprises moving the cam to the position to move the nozzle and compensate for the lateral acceleration such that coolant drops within a target area of the motor.

20 Claims, 7 Drawing Sheets

SYSTEM AND METHOD OF ACTIVE END-TURN COOLING FOR AN INTERIOR PERMANENT MAGNET MOTOR

INTRODUCTION

The present disclosure relates to distributing coolant in an interior permanent magnet motor and, more particularly, systems and methods of active end-turn cooling for an interior permanent magnet motor.

Many battery electric vehicles are operated with an electric motor such as an interior permanent magnet (IPM) motor. Many IPM motors are cooled with coolant or coolant oil or transmission oil. During vehicle operation, current IPM motors may experience an undesirable maldistribution of coolant to the IPM motor due lack of control of coolant distribution, change in motion, and frame tilt of the vehicle. A maldistribution of coolant to the IPM motor may lead to an undesirable hot spot on an area of the motor.

SUMMARY

Thus, while current interior permanent magnet (IPM) motors achieve their intended purpose, there is a need for an improved IPM motor having controllable coolant distribution and a system for controlling coolant distribution in an IPM motor of a vehicle.

In accordance with one aspect of the present disclosure, a method of active end-turn cooling of an interior permanent magnet motor of a vehicle is provided. The method comprises providing a motor. The motor comprises a rotary shaft connected to a rotor, and a stator unit comprising conductive windings arranged about the rotor. The windings have a straight portion radially extending to an end-turn portion having a target area. The motor further comprises an oil sump disposed above the stator unit. The oil sump comprises a reservoir having an inner side for containment of coolant and an outer side arranged above the end-turn portion. The reservoir has at least one aperture formed therethrough over the target area of the end-turn portion.

In this aspect, the motor further comprises a movable nozzle having a first open end extending to a second open end. The first open end connected to the at least one aperture such that the movable nozzle and reservoir are in fluid communication. The second open end extends from the at least one aperture and is positioned adjacently above the target area of the end turn portion for coolant distribution. A cam is in movable contact with the moveable nozzle. The cam is moveably arranged to move the second open end of the nozzle over the target area of the end turn portion for distribution of coolant from the oil sump to the end turn portion.

The method further comprises measuring vehicle speed, vehicle lateral acceleration, and road tilt angle of coolant due to road tilt of the vehicle. In this aspect, the method further comprises calculating coolant angle, coolant acceleration angle based on the lateral acceleration and the road tilt angle if the speed of the vehicle is greater than zero. The coolant angle is defined as a first angle of coolant drops at the end-turn relative to the second end. The coolant acceleration angle is defined as an angle caused by the gravity and the lateral acceleration. In this aspect, the method further comprises comparing the acceleration angle with a critical angle being a maximum angle that coolant drops within the target area relative to the second end.

In this aspect, the method further comprises, calculating a first control angle and a first coolant distance based on the road tilt angle and the lateral acceleration of the vehicle if the acceleration angle is greater than the critical angle. The first coolant distance is a first distance of coolant drops relative to the target area due to lateral acceleration.

The method further comprises determining a cam position based on the first control angle. The cam position is a position at which the cam is arranged to move the second open end of the nozzle to compensate for the lateral acceleration of the vehicle such that the coolant drops within the target area of the end-turn. In this aspect, the method further comprises moving the cam to the position to move the second open end and compensate for the lateral acceleration of the vehicle such that the coolant drops within the target area of the end-turn.

In an example of this aspect of the present disclosure, the step of calculating the coolant acceleration angle and the first coolant distance comprises applying $$\theta_{lat} = \tan^{-1}\left(\frac{a_{lat}}{g}\right)$$

and $$m = l\,tan(\theta) = l\,tan(\theta_{lat} + \theta_{tilt})$$

where $\theta_{lat}$ is coolant acceleration angle, $\theta_{tilt}$ is road tilt angle, $\theta$ is coolant angle ($\theta = \theta_{tilt} + \theta_{lat}$), $a_{lat}$ is lateral acceleration, g is gravity constant, and m is the first coolant distance.

In another example, the step of calculating the first control angle comprises applying $$m:l = Lsin(\theta_{ctrl}):L(1-cos(\theta_{ctrl})) + l$$

to provide $$m(L(1-cos(\theta_{ctrl})) + l) = lLsin(\theta_{ctrl})$$

and $$\theta_{ctrl} = 2\left(\tan^{-1}\left(\frac{lL - \sqrt{l(lL^2 - lm^2 - 2Lm^2)}}{lm + 2Lm}\right)\right)$$

where, L is length of the moveable nozzle, l is distance between the second end of the nozzle and the end-turn, m is coolant traveled distance or first coolant distance by the lateral acceleration and the road tilt angle, and r is radius of the target area.

In yet another example, the method further comprises comparing the road tilt angle with the critical angle if the speed of the vehicle is zero. The road tilt angle is defined as a second angle of coolant drops at the end turn relative to the second end. In this example, the method comprises calculating a second control angle and a second coolant distance based on the road tilt angle of the vehicle if the road tilt angle is greater than the critical angle. The second coolant distance is a second distance of coolant drops relative to the target area due to road tilt.

In still another example, the step of calculating the second control angle comprises applying $$m:l = Lsin(\theta_{ctrl}):L(1-cos(\theta_{ctrl})) + l$$

to provide $$m(L(1-cos(\theta_{ctrl}))+l) = lLsin(\theta_{ctrl})$$

and $$\theta_{ctrl} = 2\left(tan^{-1}\left(\frac{lL - \sqrt{l(lL^2 - lm^2 - 2Lm^2)}}{lm + 2Lm}\right)\right)$$

where L is length of the moveable nozzle, l is distance between the second end of the nozzle and the end-turn, m is coolant traveled distance or the second coolant distance by the road tilt angle, and r is radius of the target area.

In another example, the method further comprises determining a cam position based on the second control angle. The cam position is a position at which the cam is arranged to move the second open end of the nozzle to compensate for the road tilt angle such that the coolant drops within the target area of the end-turn.

In yet another example, the method further comprises moving the cam to the position to move the second open end and compensate for the road tilt angle such that the coolant drops within the target area of the end-turn.

In still another example, the critical angle is the maximum angle that coolant drops within the target area, the critical angle being represented by $$\theta_{crit} = tan^{-1}\left(\frac{r}{l}\right)$$

where, $\theta_{crit}$ is the maximum angle that coolant drops within the target area, l is distance between the second end of the nozzle and the end-turn, and r is radius of the target area.

In accordance with another aspect of the present disclosure, a system for active end-turn cooling of an interior permanent magnet motor of a vehicle is disclosed. The system comprises a motor comprising a rotary shaft connected to a rotor and a stator unit. The stator unit comprises conductive windings arranged about the rotor. The windings have a straight portion radially extending to an end-turn portion having a target area. The motor further comprises an oil sump disposed above the stator unit. The oil sump comprises a reservoir having an inner side for containment of coolant and an outer side arranged above the end-turn portion. The reservoir has at least one aperture formed therethrough over the target area of the end-turn portion.

In this embodiment, the motor further comprises a movable nozzle having a first open end extending to a second open end. The first open end is connected to the at least one aperture such that the movable nozzle and reservoir are in fluid communication. The second open end extends from the at least one aperture and positioned adjacently above the target area of the end turn portion for coolant distribution. The system further comprises a connector being movably disposed proximate to the movable nozzle. The motor further comprises a cam being in movable contact with the moveable nozzle. The cam is moveably arranged to move the second open end of the nozzle over the target area of the end turn portion for distribution of coolant from the oil sump to the end turn portion.

In this embodiment, the system further comprises an actuator in communication with the connector and arranged to move the connector and the cam to move the second open end such that coolant drops within the target area of the end-turn. The system further comprises a sensor configured to measure vehicle speed, vehicle lateral acceleration, and road tilt angle of coolant due to road tilt of the vehicle. The sensor is arranged to send a signal of the vehicle speed, vehicle lateral acceleration, and road tilt angle.

The system further comprises a controller in communication with the actuator and configured to control the actuator when the signal is received from the senso. The controller is configured to calculate a coolant acceleration angle based on the lateral acceleration if the speed of the vehicle is greater than zero. The coolant acceleration angle is defined as a first angle of coolant drops at the end-turn relative to the second end. The controller is configured to compare the acceleration angle with a critical angle being a maximum angle that coolant drops within the target area relative to the second end. The system further comprises a power source configured to power the actuator, the sensor, and the controller.

In this embodiment, the controller is configured to calculate a first control angle and a first coolant distance based on the lateral acceleration of the vehicle if the acceleration angle is greater than the critical angle. The first coolant distance is a first distance of coolant drops relative to the target area due to lateral acceleration. The controller is configured to determine a cam position based on the first control angle. The cam position is a position at which the cam is arranged to move the second open end of the nozzle to compensate for the lateral acceleration of the vehicle such that the coolant drops within the target area of the end-turn.

In this embodiment, the controller is configured to control the actuator to move the cam to the position to thereby move the second open end and compensate for the lateral acceleration of the vehicle such that the coolant drops within the target area of the end-turn.

In one embodiment of this aspect, the controller is configured to calculate the coolant acceleration angle and the first coolant distance comprises applying $$\theta_{lat} = tan^{-1}\left(\frac{a_{lat}}{g}\right)$$

and $$m = l\,tan(\theta) = l\,tan(\theta_{lat} + \theta_{tilt})$$

where $\theta_{lat}$ is coolant acceleration angle, $\theta_{tilt}$ is road tilt angle, $\theta$ is coolant angle ($\theta = \theta_{tilt} + \theta_{lat}$), $a_{lat}$ is lateral acceleration, g is gravity constant, and m is the first coolant distance.

In another embodiment, the controller is configured to calculate the first control angle comprises applying $$m : l = Lsin(\theta_{ctrl}) : L(1 - cos(\theta_{ctrl})) + l$$

to provide $$m(L(1-cos(\theta_{ctrl}))+l) = lLsin(\theta_{ctrl})$$

and $$\theta_{ctrl} = 2\left(tan^{-1}\left(\frac{lL - \sqrt{l(lL^2 - lm^2 - 2Lm^2)}}{lm + 2Lm}\right)\right)$$

where, L is length of the moveable nozzle, l is distance between the second end of the nozzle and the end-turn, m is coolant traveled distance or first coolant distance by the lateral acceleration and the road tilt angle, and r is radius of the target area.

In yet another embodiment, the controller is configured to compare the road tilt angle with the critical angle if the speed of the vehicle is zero. The road tilt angle is defined as a second angle of coolant drops at the end turn relative to the second end. In this embodiment, the controller is configured to calculate a second control angle and a second coolant distance based on the road tilt angle of the vehicle if the road tilt angle is greater than the critical angle. The second coolant distance being a second distance of coolant drops relative to the target area due to road tilt.

In still another embodiment, the controller is configured to calculate the second control angle comprises applying $$m: l = L\sin(\theta_{ctrl}) : L(1-\cos(\theta_{ctrl})) + l$$

to provide $$m(L(1-\cos(\theta_{ctrl}))+l) = lL\sin(\theta_{ctrl})$$

and $$\theta_{ctrl} = 2\left(\tan^{-1}\left(\frac{lL - \sqrt{l(lL^2 - lm^2 - 2Lm^2)}}{lm + 2Lm}\right)\right)$$

where L is length of the moveable nozzle, l is distance between the second end of the nozzle and the end-turn, m is coolant traveled distance or the second coolant distance by the road tilt angle, and r is radius of the target area.

In yet another embodiment, the controller is configured to determine a cam position based on the second control angle. The cam position is a position at which the cam is arranged to move the second open end of the nozzle to compensate for the road tilt angle such that the coolant drops within the target area of the end-turn.

In still another embodiment, the controller is configured to control the actuator to move the cam to the position to move the second open end and compensate for the road tilt angle such that the coolant drops within the target area of the end-turn.

In another embodiment, the critical angle is the maximum angle that coolant drops within the target area, the critical angle being represented by $$\theta_{crit} = \tan^{-1}\left(\frac{r}{l}\right)$$

where, $\theta_{crit}$ is the maximum angle that coolant drops within the target area, l is distance between the second end of the nozzle and the end-turn, and r is radius of the target area.

In accordance with another aspect of the present disclosure, a method of active end-turn cooling of an interior permanent magnet motor of a vehicle. The method comprises providing a motor comprising a rotary shaft connected to a rotor and a stator unit comprising conductive windings arranged about the rotor. The windings have a straight portion radially extending to an end-turn portion having a target area. The motor further comprises an oil sump disposed above the stator unit. The oil sump comprising a reservoir having an inner side for containment of coolant and an outer side arranged above the end-turn portion. The reservoir has at least one aperture formed therethrough over the target area of the end-turn portion.

In this aspect, the motor further comprises a movable nozzle having a first open end extending to a second open end. The first open end connected to the at least one aperture such that the movable nozzle and reservoir are in fluid communication. The second open end extending from the at least one aperture and positioned adjacently above the target area of the end turn portion for coolant distribution.

In this aspect, the motor comprises a cam in movable contact with the moveable nozzle. The cam is moveably arranged to move the second open end of the nozzle over the target area of the end turn portion for distribution of coolant from the oil sump to the end turn portion.

The method further comprises measuring vehicle speed, vehicle lateral acceleration, and road tilt angle of coolant due to road tilt of the vehicle. The method further comprises calculating coolant acceleration angle based on the lateral acceleration if the speed of the vehicle is greater than zero. The coolant acceleration angle is defined as a first angle of coolant drops at the end-turn relative to the second end.

In this aspect, the method further comprises comparing the acceleration angle with a critical angle being a maximum angle that coolant drops within the target area relative to the second end. The method further comprises calculating a first control angle and a first coolant distance based on the lateral acceleration of the vehicle if the acceleration angle is greater than the critical angle. The first coolant distance is a first distance of coolant drops relative to the target area due to lateral acceleration.

The method further comprises comparing the road tilt angle with the critical angle if the speed of the vehicle is zero. The road tilt angle is defined as a second angle of coolant drops at the end turn relative to the second end. The method further comprises calculating a second control angle and a second coolant distance based on the road tilt angle of the vehicle if the road tilt angle is greater than the critical angle. The second coolant distance is a second distance of coolant drops relative to the target area due to road tilt.

In this aspect, the method further comprises determining a cam position based on one of the first control angle and the second control angle. The cam position is a position at which the cam is arranged to move the second open end of the nozzle to compensate for one of the lateral acceleration and the road tilt angle of the vehicle such that the coolant drops within the target area of the end-turn.

The method further comprises moving the cam to the position to move the second open end and compensate for one of the lateral acceleration and the road tilt angle of the vehicle such that the coolant drops within the target area of the end-turn.

In one example, the step of calculating the coolant acceleration angle and the first coolant distance comprises applying:

$$\theta_{lat} = \tan^{-1}\left(\frac{a_{lat}}{g}\right)$$

and $$m = l\tan(\theta) = l\tan(\theta_{lat} + \theta_{tilt})$$

where $\theta_{lat}$ is coolant acceleration angle, $\theta_{tilt}$ is road tilt angle, $\theta$ is coolant angle ($\theta = \theta_{tilt} + \theta_{lat}$), $a_{lat}$ is lateral acceleration, g is gravity constant, and m is the first coolant distance.

In another example, the step of calculating the first control angle comprises applying:

$$m:l = Lsin(\theta_{ctrl}): L(1 - cos(\theta_{ctrl})) + l$$

to provide $$m(L(1 - cos(\theta_{ctrl})) + l) = lLsin(\theta_{ctrl})$$

and $$\theta_{ctrl} = 2\left(\tan^{-1}\left(\frac{lL - \sqrt{l(lL^2 - lm^2 - 2Lm^2)}}{lm + 2Lm}\right)\right)$$

where, L is length of the moveable nozzle, l is distance between the second end of the nozzle and the end-turn, m is coolant traveled distance or first coolant distance by the lateral acceleration and the road tilt angle, and r is radius of the target area.

In still another example, the step of calculating the second control angle comprises applying:

$$m:l = Lsin(\theta_{ctrl}): L(1 - cos(\theta_{ctrl})) + l$$

to provide $$m(L(1 - cos(\theta_{ctrl})) + l) = lLsin(\theta_{ctrl})$$

and $$\theta_{ctrl} = 2\left(\tan^{-1}\left(\frac{lL - \sqrt{l\left(lL^2 - lm^2 - 2Lm^2\right)}}{lm + 2Lm}\right)\right)$$

where L is length of the moveable nozzle, l is distance between the second end of the nozzle and the end-turn, m is coolant traveled distance or the second coolant distance by the road tilt angle, and r is radius of the target area.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1A:
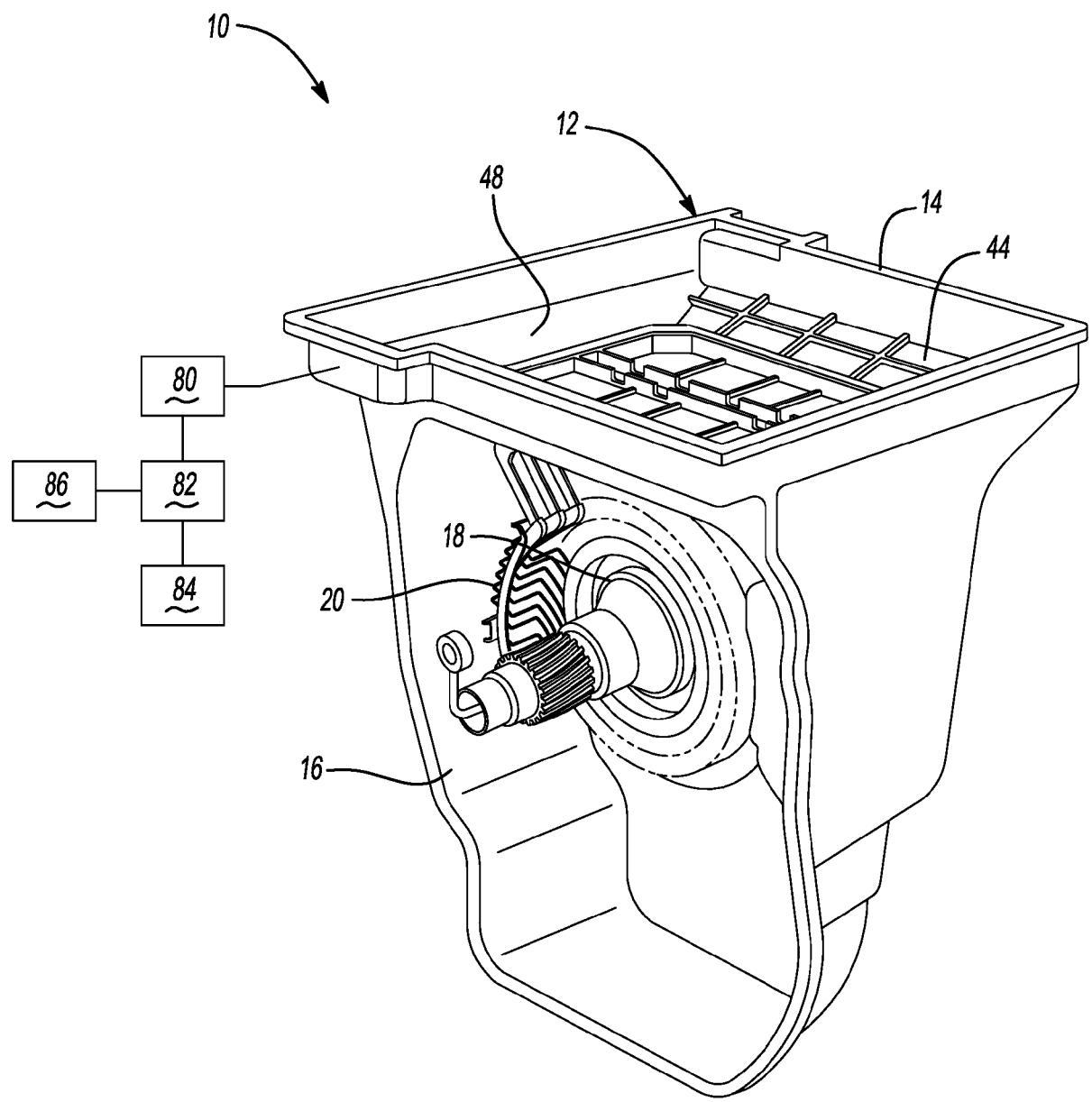
FIG. 1A is a schematic view of a system for active end-turn cooling of an interior permanent magnet motor of a vehicle in accordance with one embodiment of the present disclosure.
Figure 1B:
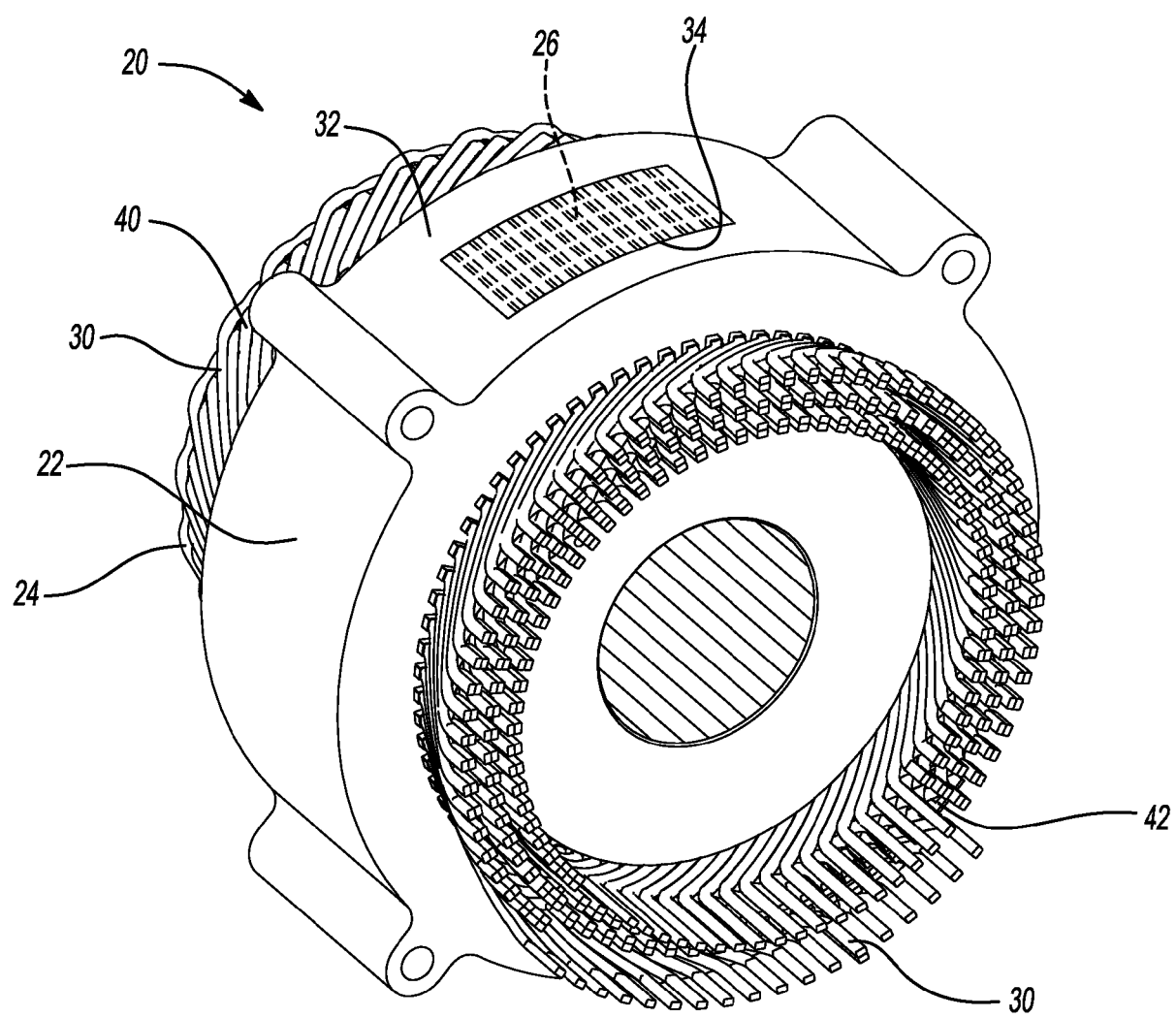
FIG. 1B is a perspective view of a stator unit of the interior permanent magnet motor in FIG. 1A.

The following description is merely exemplary in nature and is not intended to limit the present disclosure, application, or uses.

The present disclosure provides systems and methods for active end-turn cooling of the stator in an electric motor such as an interior permanent magnet (IPM) motor of a vehicle. The systems and methods of the present disclosure provide a controlled distribution of coolant on an end-turn of an electric motor such as an IPM motor. The system includes an electric motor and a controller to control a distribution of coolant. The motor preferably comprises a plurality of nozzles in fluid communication with an oil sump that is configured to hold coolant for gravitational distribution of coolant over a stator unit of the motor. The nozzles are movably disposed adjacently above a stator unit of the motor and are controllable by the controller such that coolant oil may be more evenly distributed to the stator unit during operation of the vehicle. A plurality of connectors in cooperation with a plurality of cams are movably connected to the nozzles such that, upon movement of the connectors, the cams move the nozzles over the stator unit. Based on lateral acceleration of the vehicle or road tilt angle of the coolant, movement of the connectors are controlled via the controller of the system having an actuator in communication with the connectors. As a result, embodiments of the present disclosure help counter or compensate for a potential maldistribution of coolant to the stator unit of the motor due to lateral acceleration and road tilt angle. That is, the systems and methods thereof provide a relatively improved distribution of coolant to the stator unit during operation of a vehicle based on lateral acceleration and road tilt angle.

In accordance with one aspect of the present disclosure, a system for active end-turn cooling of an electric motor such as an interior permanent magnet (IPM) motor of a vehicle is illustrated in FIGS. 1A-1D. As shown, the motor 12 further comprises a stator unit 20 disposed in the housing 14. The stator unit 20 comprises a core 22 within which conductive windings 24 are radially disposed and radially extending therefrom. In this embodiment, the windings 24 are arranged about the rotor 18 and have a straight portion 26 (shown in phantom) radially extending to end-turn portions 30 having a target area 31. The target area is an area on which coolant is to be dropped or distributed during operation of the vehicle.

As shown, the straight portion 26 has a first radial side 32 radially extending to a second radial side 34. Moreover, the end-turn portions 30 have a first turn portion 40 radially extending from the first radial side 32 and a second turn portion 42 radially extending from the second radial side 34. As shown in FIGS. 1A-1D, The core 22 is arranged about the straight portion 26 of the windings 24. The first and second turn portions radially extend from the core 22. As will be discussed below, coolant oil is distributed on the first and second turn portions during operation of the motor 12.

With reference to FIGS. 1A-1D, the motor 12 further comprises an oil sump 44 disposed on the housing 14 above the core 22. The oil sump 44 comprises a reservoir 46 having an inner side 48 for containment of coolant (or coolant oil or transmission oil) and an outer side 50 arranged above the core 22. The reservoir 46 has at least one aperture 52, preferably a plurality of apertures 52, formed therethrough over the end-turn portions 30 (the first turn portion 40 and the second turn portion), which extend from the core 22. The apertures 52 allow for gravitational distribution of coolant to the stator unit 20. As shown in FIG. 3, each aperture 52 is formed through the reservoir 46 over one of the first and second turn portions extending from the core 22.

Figure 1C:
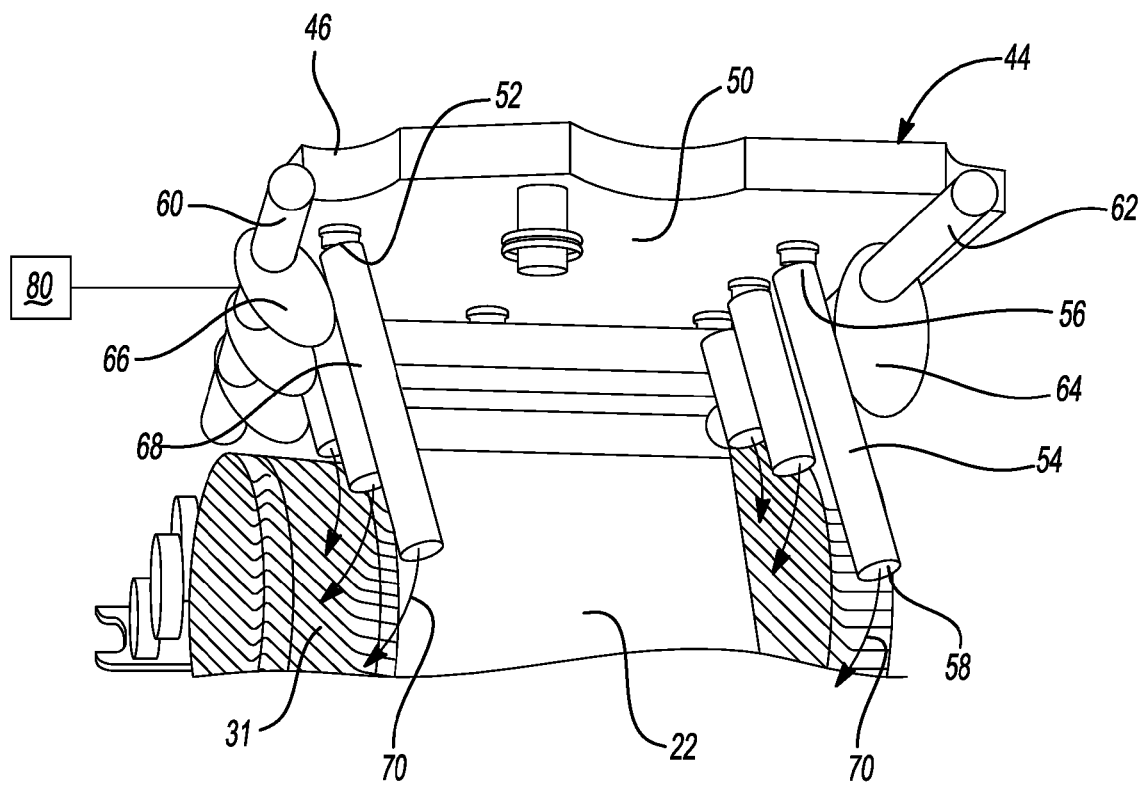
FIG. 1C is an end view of the stator unit in operation when the vehicle is tilted in a first direction.
Figure 1D:
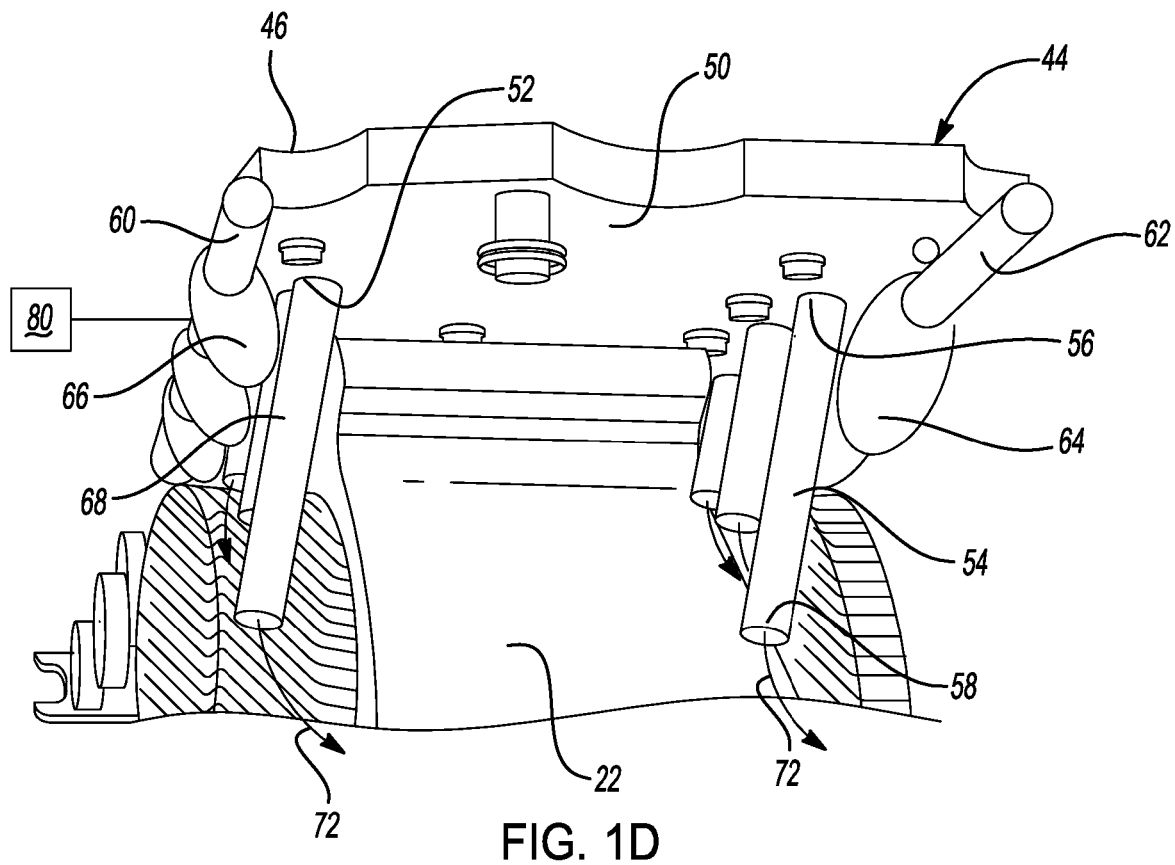
FIG. 1D is an end view of the stator unit in operation when the vehicle is tilted in a second direction.

As depicted in FIGS. 1C-1D, the motor 12 further comprises a movable nozzle or pipe 54, preferably a plurality of movable nozzles 54, having a first open end 56 extending to a second open end 58. As shown, each first open end 56 is connected to one of the apertures 52 such that each movable nozzle 54 and the reservoir 46 are in fluid communication for controlled gravitational distribution of coolant to the stator unit 20. Each second open end 58 extends from the aperture 52 to which the respective first open end 56 is connected and is positioned adjacently above the target area 31 of the end turn portion 30 for coolant distribution. As shown, each second open end 58 is positioned adjacently above either the first turn portion 40 or the second turn portion 42 such that coolant oil may be gravitationally distributed onto the respective target area 31 of the end turn portion 30 of the stator unit 20 in a controlled manner.

As will be discussed in greater detail below, the movable nozzles 54 are arranged to be movable over one of the first and second turn portions to provide a more even distribution of coolant oil to the motor 12. The position of the apertures 52 and the second open ends 58 above the first and second turn portions allow for coolant oil to be distributed thereon by way of gravity. During operation, control of movement of the second ends provides a more even distribution of coolant oil on the motor 12 as discussed in greater detail below.

It is understood that the movable nozzles 54 may be made of any suitable material such as polymeric material or metallic material without departing from the spirit or scope of the present disclosure. For example, if the nozzles 54 are comprised of metallic material, the first open end 56 may be connected to the apertures 52 by way of a flexible or pivotable connection, thereby allowing the second open end 58 to be movable relative to the end turn portions 30. Moreover, if the nozzles 54 are comprised of polymeric material, the polymeric material may be any suitable plastic to thereby allow the second open end 58 to be movable relative to the end turn portions 30.

Further to this embodiment, FIGS. 1C-1D illustrate a plurality of connectors movably disposed in the housing 14. For example, a first connector 60 and a second connector 62 are movably disposed proximate to the movable nozzles 54. In this embodiment, the connectors are movable rods, each of which are arranged to be movable about a rotational axis. As depicted, the first connector 60 and the second connector 62 movably rotate about axes.

Referring to FIGS. 1C-1D, the first connector 60 is disposed proximately above the first turn portion 40 and the second connector 62 is disposed proximately above the second turn portion. In this embodiment, a plurality of cams 64 are connected to each of the first and second connectors 60, 62. Each cam 64 has a first portion 66 extending to a second portion 68. As illustrated, the first portion 66 is connected to the respective connector and the second portion 68 is slidably connected to one of the plurality of nozzles 54.

It is understood that the second portion 68 may be slidably connected to one of the nozzles 54 by any suitable manner without departing from the spirit or scope of the present disclosure. For example, the second portion 68 may be slidably connected to one of the nozzles 54 by way of a slider mechanism (not shown), allowing the second portion 68 to slide along a length of the nozzle 54 to thereby move the second open end 58 when the respective connector rotates about its axis. Thus, upon rotational movement of its respective connector, each cam 64 is arranged with the connector to move the second open end 58 of the nozzle 54 over the end turn portion 30 for distribution of coolant oil from the oil sump 44 to the end turn portion 30.

It is understood that the nozzles 54 and the cam 64 may be made of metallic material. In this embodiment, the second portion 68 of the cam 64 may be slidably connected to the nozzle 54 by way of a magnetic mechanism (not shown). The magnetic mechanism may allow the second portion 68 to slide along a length of the nozzle 54 to thereby move the second open end 58 when the respective connector rotates about its axis.

FIGS. 1C-1D depict coolant oil flow 70, 72 during operation of a vehicle as a result of an implementation of the system 10 of the present disclosure. When the vehicle experiences vehicle lateral acceleration or a road tilt, the distribution of coolant oil flow 70, 72 to the end turn portions 30 may be affected. Such change in motion or tilt of the vehicle frame may result in an uneven or a maldistribution of coolant oil to the end turn portions 30 without implementation of the system 10. In accordance with the present disclosure, the system 10 provides a more even distribution of coolant to the motor 12 by moving the connectors and cams 64 to thereby move the nozzles 54 across the end turn portions 30 such that coolant drops contact the target area. As shown in FIGS. 1C-1D, coolant flow 70, 72 is affected by implementation of the system 10. As a result and as described in greater detail below, the system 10 compensates for a potential maldistribution of coolant oil to the motor 12 based on lateral acceleration of the vehicle and road tilt angle of coolant due to road tilt of the vehicle.

In this embodiment, the system 10 further comprises an actuator 80, a controller 82, a sensor 84, and a power source 86 as depicted in FIGS. 1A-1D. As shown, the actuator 80 is in communication with the connector. That is, the actuator 80 is arranged to move the first and second connectors 60, 62 and the cams 64. Movement of the connectors and cams 64 thereby moves the second open end 58 of the nozzle 54 over the end turn portions 30.

Referring to FIGS. 1A-1D, the system further comprises the sensor 84 configured to measure vehicle speed, vehicle lateral acceleration, and road tilt angle of coolant due to road tilt of the vehicle. When vehicle speed, vehicle lateral acceleration, and road tilt are sense, the sensor 84 is arranged to send a signal related thereto to a controller 82. It is understood that the sensor 84 may be disposed in any suitable location of the vehicle (e.g., adjacent the movable nozzles, adjacent the front wheels, steering wheel, center of vehicle) to sense speed, lateral acceleration, and road tilt angle without departing from the spirit or scope of the present disclosure.

As depicted in FIG. 1A, the system further comprises the controller 82 in communication with the actuator and configured to control the actuator when the signal is received from the sensor 84. The controller 82 is configured to calculate a coolant angle, a coolant acceleration angle, and a first coolant distance based on the lateral acceleration and road tilt angle if the speed of the vehicle is greater than zero. In this embodiment, the coolant angle is defined as a first angle of coolant drops at the end-turn relative to the second end. The coolant acceleration angle is defined as an angle caused by the gravity and the lateral acceleration. The first coolant distance is a first distance of coolant drops relative to the target area due to lateral acceleration and road tilt angle.

Figure 2A:
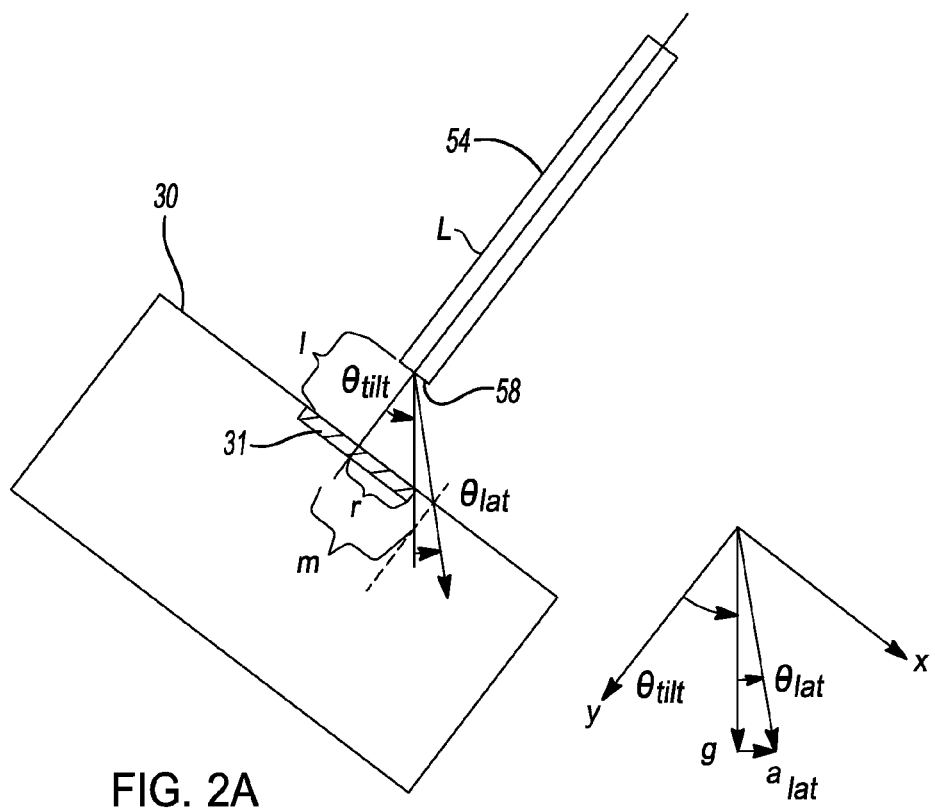
FIGS. 2A-2B are schematic partial side views of an interior permanent magnet motor with a coolant acceleration angle based on lateral acceleration of the vehicle.
Figure 2B:
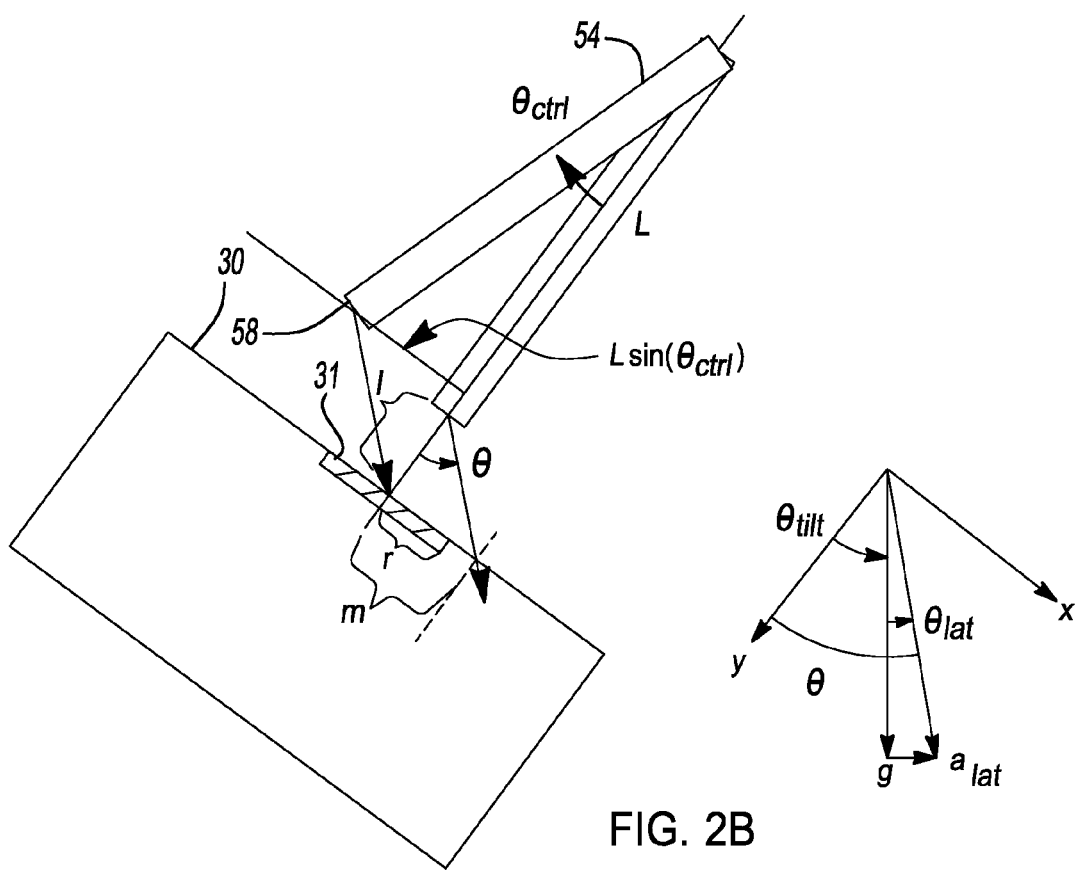

In this embodiment and as shown in FIGS. 2A-2B, the controller calculates the coolant acceleration angle and the first coolant distance by applying:

$$\theta_{lat} = \tan^{-1}\left(\frac{a_{lat}}{g}\right)$$

and $$m = l\tan(\theta) = l\tan(\theta_{tilt} + \theta_{lat})$$

where θ $\theta_{lat}$ is coolant acceleration angle, $\theta_{lat}$ is road tilt angle, θ is coolant angle (θ = $\theta_{tilt}$ + $\theta_{lat}$), $a_{lat}$ is lateral acceleration, g is gravity constant, and m is the first coolant distance.

The controller 82 is configured to compare the coolant angle with a critical angle. The critical angle is a maximum angle that coolant drops within the target area 31 relative to the second end. Preferably, the critical angle is represented by:

$$\theta_{crit} = \tan^{-1}\left(\frac{r}{l}\right)$$

where, $\theta_{crit}$ is the maximum angle that coolant drops within the target area 31, l is distance between the second end of the nozzle and the end-turn, and r is radius of the target area 31.

In this embodiment, the controller 82 is configured to calculate a first control angle based on the road tilt angle and the lateral acceleration of the vehicle if the coolant angle is greater than the critical angle. The first coolant distance is a first distance of coolant drops relative to the target area 31 due to road tilt angle and lateral acceleration. As shown in FIGS. 2A-2B, the controller calculates the first control angle by applying:

$$m:l = L\sin(\theta_{ctrl}) : L(1-\cos(\theta_{ctrl})) + l$$

to provide $$m(L(1-\cos(\theta_{ctrl})) + l) = lL\sin(\theta_{ctrl})$$

and $$\theta_{ctrl} = 2\left(\tan^{-1}\left(\frac{lL - \sqrt{l(lL^2 - lm^2 - 2Lm^2)}}{lm + 2Lm}\right)\right)$$

where, L is length of the moveable nozzle 54, l is distance between the second end 58 of the nozzle 54 and the end-turn 30, m is coolant traveled distance or first coolant distance by the lateral acceleration and the road tilt angle, and r is radius of the target area 31.

The controller 82 is configured to determine a cam position based on the first control angle. The cam position is a position at which the cam is arranged to move the second open end 58 of the nozzle 54 to compensate for the road tilt angle and the lateral acceleration of the vehicle such that the coolant drops within the target area 31 of the end-turn 30.

In this embodiment, the controller 82 is configured to control the actuator 80 to move the connectors 60, 62 cam 64 (FIGS. 1C-1D) to the position to thereby move the second open end 58 and compensate for the road tilt angle and the lateral acceleration of the vehicle such that the coolant drops within the target area 31 of the end-turn 30.

In another embodiment, the controller 82 is also configured to compare the road tilt angle with the critical angle if the speed of the vehicle is zero. In this embodiment, the road tilt angle is defined as a second angle of coolant drops at the end turn relative to the second end.

Figure 3A:
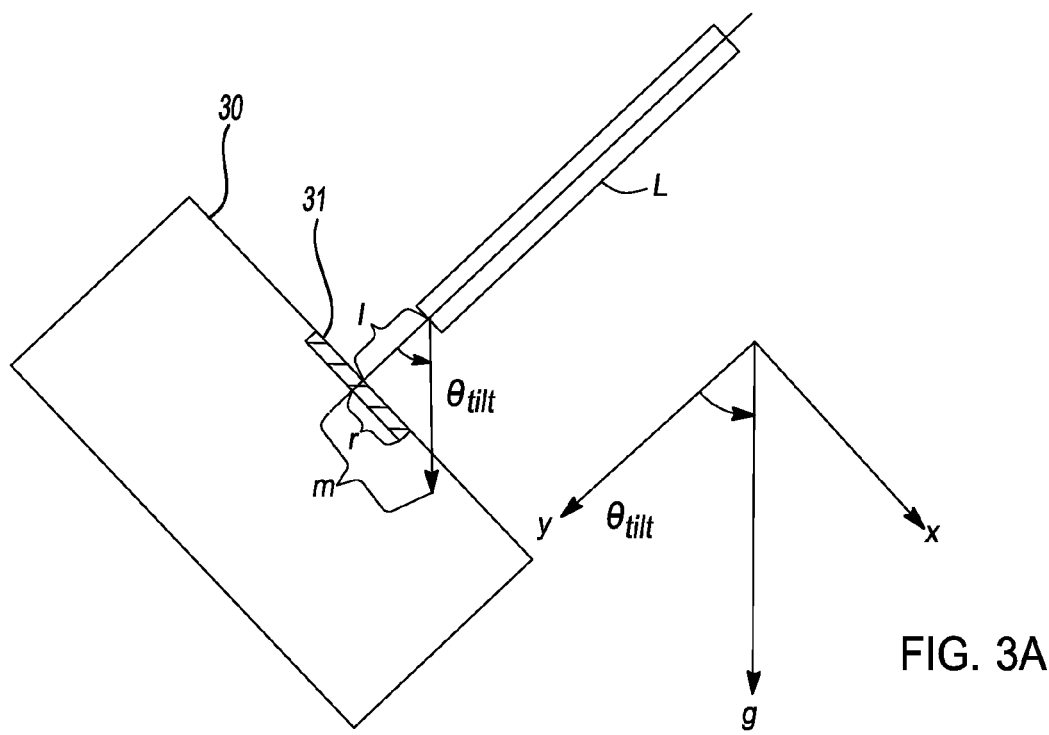
FIGS. 3A-3B are a schematic partial side view of an interior permanent magnet motor with a road tilt angle based on based on road tilt of the vehicle.
Figure 3B:
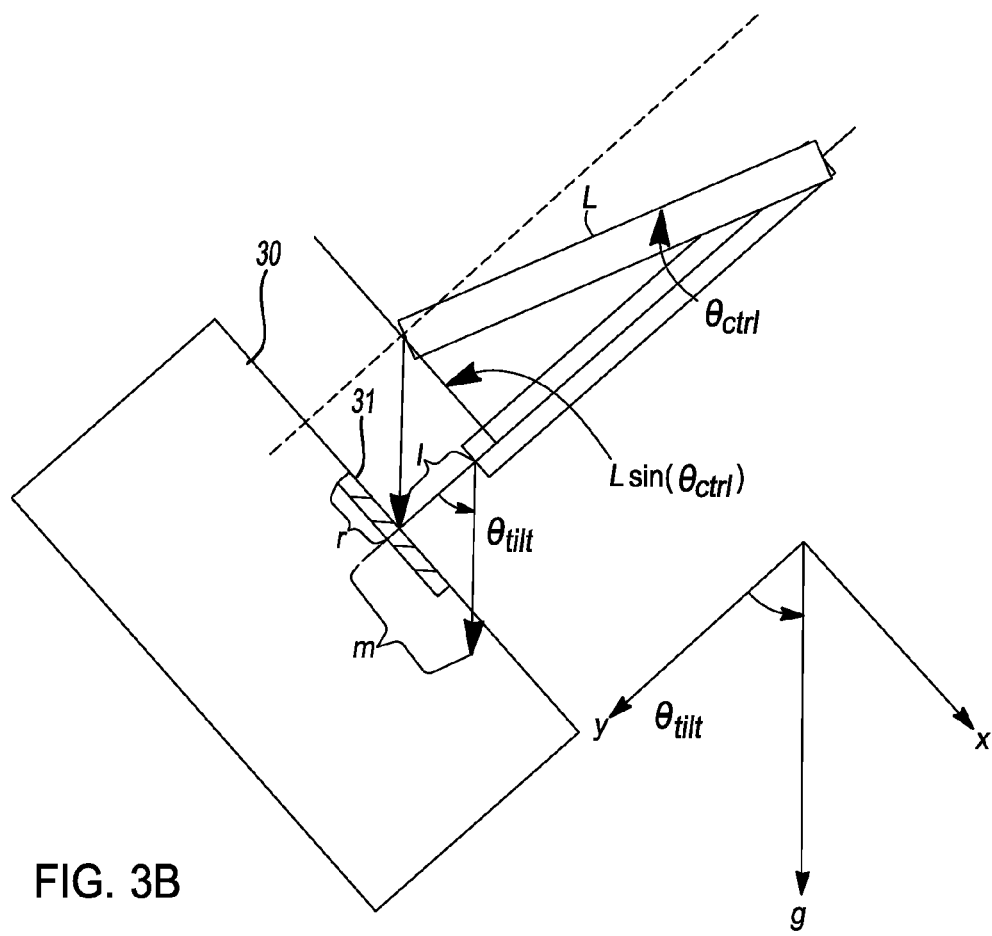

Referring to FIGS. 3A-3B, the controller 82 is configured to calculate a second coolant distance and a second control angle and based on the road tilt angle of the vehicle if the road tilt angle is greater than the critical angle. The second coolant distance is a second distance of coolant drops relative to the target area due to road tilt. Preferably, the controller 82 calculates the second control angle by applying:

$$m:l = L\sin(\theta_{ctrl}) : L(1-\cos(\theta_{ctrl})) + l$$

to provide $$m(L(1-\cos(\theta_{ctrl})) + l) = lL\sin(\theta_{ctrl})$$

and $$\theta_{ctrl} = 2\left(\tan^{-1}\left(\frac{lL - \sqrt{l(lL^2 - lm^2 - 2Lm^2)}}{lm + 2Lm}\right)\right)$$

where L is length of the moveable nozzle 54, l is distance between the second end 58 of the nozzle 54 and the end-turn 30, m is coolant traveled distance or the second coolant distance by the road tilt angle, and r is radius of the target area 31. As shown, an x and y axes are provided to depict gravity g and road tilt angle $\theta_{tilt}$.

In this embodiment, the controller 82 is configured to determine a cam position based on the second control angle. The cam position is a position at which the cam is arranged to move the second open end 58 of the nozzle 54 to compensate for the road tilt angle such that the coolant drops within the target area 31 of the end-turn 30. In this example, the controller 82 is configured to control the actuator 80 to move the connectors 60, 62 and cams 64 (FIGS. 1A-1D) to the position to thereby move the second open end 58 and compensate for the road tilt angle such that the coolant drops within the target area 31 of the end-turn 30.

The system 10 also comprises a power source 86 configured to power at least one of the actuator 80, the sensor 84, and the controller 82.

Figure 4:
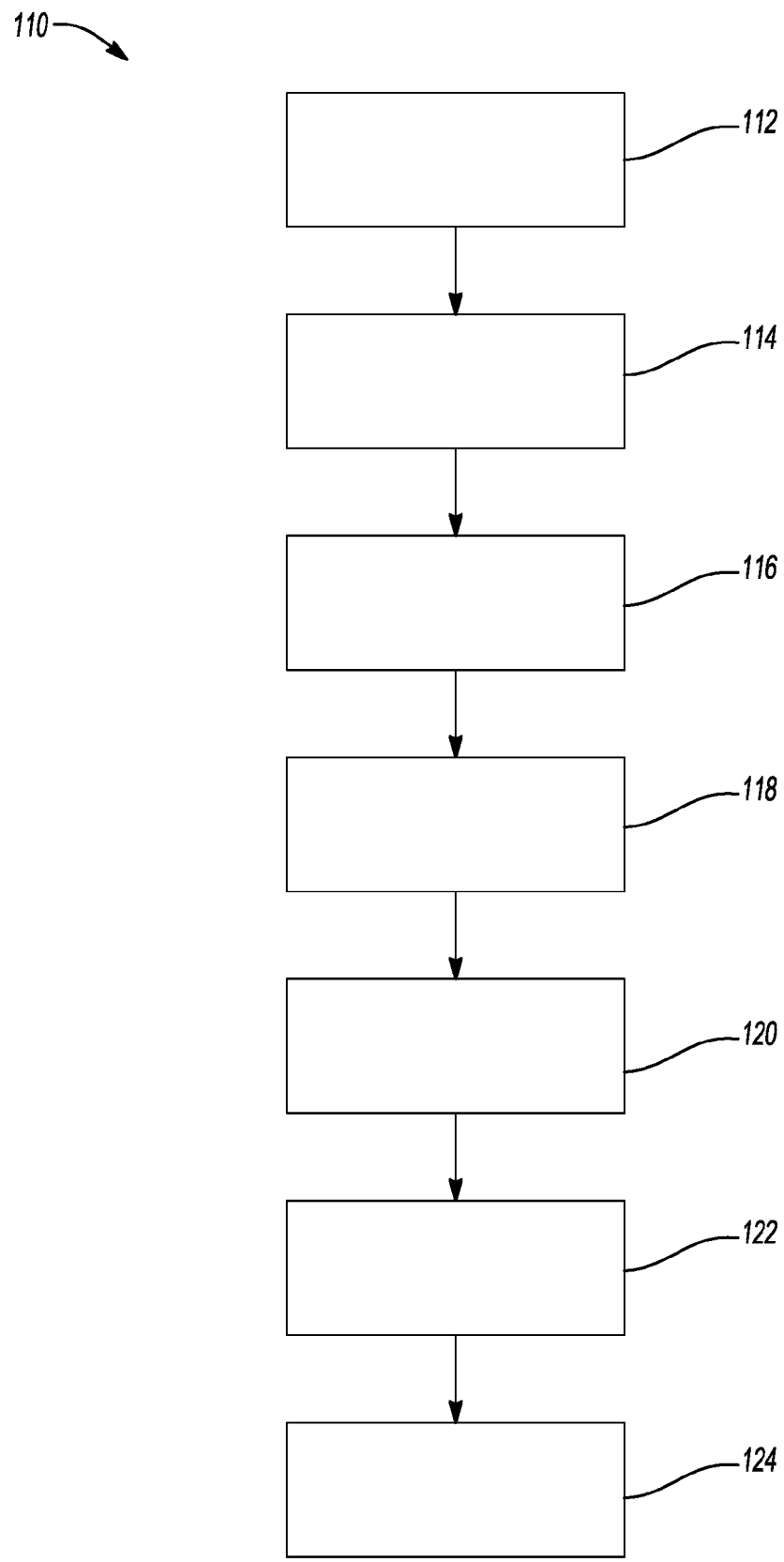
FIG. 4 is a flowchart of a method of active end-turn cooling of the interior permanent magnet motor in FIGS. 1A-1D in accordance with one example of the present disclosure.

FIG. 4 depicts a method 110 of active end-turn cooling of an electric motor such as an interior permanent magnet motor of a vehicle in accordance with one example of the present disclosure. In this example, the method is implemented by the system in FIGS. 1A-1D. As shown, the method comprises in box 112 providing a motor 12. The motor 12 comprises a rotary shaft 16 connected to a rotor 18, and a stator unit 20 comprising conductive windings 24 arranged about the rotor 18. The windings 24 have a straight portion 26 radially extending to an end-turn portion 30 having a target area 31.

The motor 12 (FIGS. 1A-1D) further comprises an oil sump 44 disposed above the stator unit 20. The oil sump 44 comprises a reservoir 46 having an inner side 48 for containment of coolant and an outer side 50 arranged above the end-turn portion 30. The reservoir 46 has at least one aperture 52 formed therethrough over the target area 31 of the end-turn portion 30. In this example, the motor 12 further comprises a movable nozzle 54 having a first open end 56 extending to a second open end 58. The first open end 56 is connected to the at least one aperture 52 such that the movable nozzle 54 and reservoir 46 are in fluid communication. The second open end 58 extends from the at least one aperture 52 and is positioned adjacently above the target area 31 of the end turn portion 30 for coolant distribution. A cam 64 is in movable contact with the moveable nozzle 54. The cam 64 is moveably arranged to move the second open end 58 of the nozzle 54 over the target area 31 of the end turn portion 30 for distribution of coolant from the oil sump 44 to the end turn portion 30. The motor 12 further comprises at least one of the connectors 60, 62 movably disposed proximate to the movable nozzle 54.

Referring to FIG. 4, the method 110 further comprises in box 114 measuring vehicle speed, vehicle lateral acceleration, and road tilt angle of coolant due to road tilt of the vehicle.

In this example, the method 110 further comprises in box 116 calculating a coolant angle, a coolant acceleration angle, and a first coolant distance based on the lateral acceleration and road tilt angle if the speed of the vehicle is greater than zero. The coolant angle is defined as a first angle of coolant drops at the end-turn 30 relative to the second end 58. The coolant acceleration angle is defined as an angle caused by the gravity and the lateral acceleration. The first coolant distance is a first distance of coolant drops relative to the target area 31 due to lateral acceleration and road tilt angle. In one example, the step of calculating the coolant acceleration angle and the first coolant distance comprises applying:

$$\theta_{lat} = \tan^{-1}\left(\frac{a_{lat}}{g}\right)$$

and $$m = l\tan(\theta) = l\tan(\theta_{tilt} + \theta_{lat})$$

where, $\theta_{lat}$ is coolant acceleration angle, $\theta_{tilt}$ is road tilt angle, $\theta$ is coolant angle ($\theta = \theta_{tilt} + \theta_{lat}$), $a_{lat}$ is lateral acceleration, g is gravity constant, and m is the first coolant distance.

Moreover, the method 110 further comprises in box 118 comparing the acceleration angle with a critical angle. In this example, the critical angle is a maximum angle that coolant drops within the target area relative to the second end. Preferably, the critical angle is represented by:

$$\theta_{crit} = \tan^{-1}\left(\frac{r}{l}\right)$$

where, $\theta_{crit}$ is the maximum angle that coolant drops within the target area, l is distance between the second end of the nozzle and the end-turn, and r is radius of the target area.

As shown in FIG. 4, the method 110 further comprises in box 120 calculating a first control angle based on the road tilt angle and the lateral acceleration of the vehicle if the acceleration angle is greater than the critical angle. Preferably, the step of calculating the first control angle comprises applying:

$$m : l = L\sin(\theta_{ctrl}) : L(1 - \cos(\theta_{ctrl})) + l$$

to provide $$m(L(1-\cos(\theta_{ctrl})) + l) = lL\sin(\theta_{ctrl})$$

and $$\theta_{ctrl} = 2\left(\tan^{-1}\left(\frac{lL - \sqrt{l(lL^2 - lm^2 - 2Lm^2)}}{lm + 2Lm}\right)\right)$$

where, L is length of the moveable nozzle, l is distance between the second end of the nozzle and the end-turn, m is coolant traveled distance or first coolant distance by the lateral acceleration and the road tilt angle, and r is radius of the target area.

The method 110 further comprises in box 122 determining a cam position based on the first control angle. The cam position is a position at which the cam is arranged to move the second open end of the nozzle to compensate for the road tilt angle and the lateral acceleration of the vehicle such that the coolant drops within the target area 31 of the end-turn 30. In this example, the method 110 further comprises in box 124 moving the cam to the position to thereby move the second open end 58 and compensate for the road tilt angle and the lateral acceleration of the vehicle such that the coolant drops within the target area 31 of the end-turn 30.

Optionally, the method 110 may further comprise comparing the road tilt angle with the critical angle if the speed of the vehicle is zero. The road tilt angle is defined as a second angle of coolant drops at the end turn relative to the second end. In this example, the method comprises calculating a second control angle and a second coolant distance based on the road tilt angle of the vehicle if the road tilt angle is greater than the critical angle. The second coolant distance is a second distance of coolant drops relative to the target area 31 due to road tilt.

Preferably, the step of calculating the second control angle comprises applying:

$$m : l = L\sin(\theta_{ctrl}) : L(1 - \cos(\theta_{ctrl})) + l$$

to provide $$m(L(1-\cos(\theta_{ctrl}))+1) = lL\sin(\theta_{ctrl})$$

and $$\theta_{ctrl} = 2\left(\tan^{-1}\left(\frac{lL - \sqrt{l(lL^2 - lm^2 - 2Lm^2)}}{lm + 2Lm}\right)\right)$$

where L is length of the moveable nozzle, l is distance between the second end of the nozzle and the end-turn, m is coolant traveled distance or the second coolant distance by the road tilt angle, and r is radius of the target area 31.

In this option, the method 110 further comprises determining a cam position based on the second control angle. The cam position is a position at which the cam is arranged to thereby move the second open end 58 of the nozzle 54 to compensate for the road tilt angle such that the coolant drops within the target area 31 of the end-turn 30. In this option, the method 110 further comprises moving the connectors 60, 62 cam 64 to the position to move the second open end 58 and compensate for the road tilt angle such that the coolant drops within the target area 31 of the end-turn 30.

Figure 5:
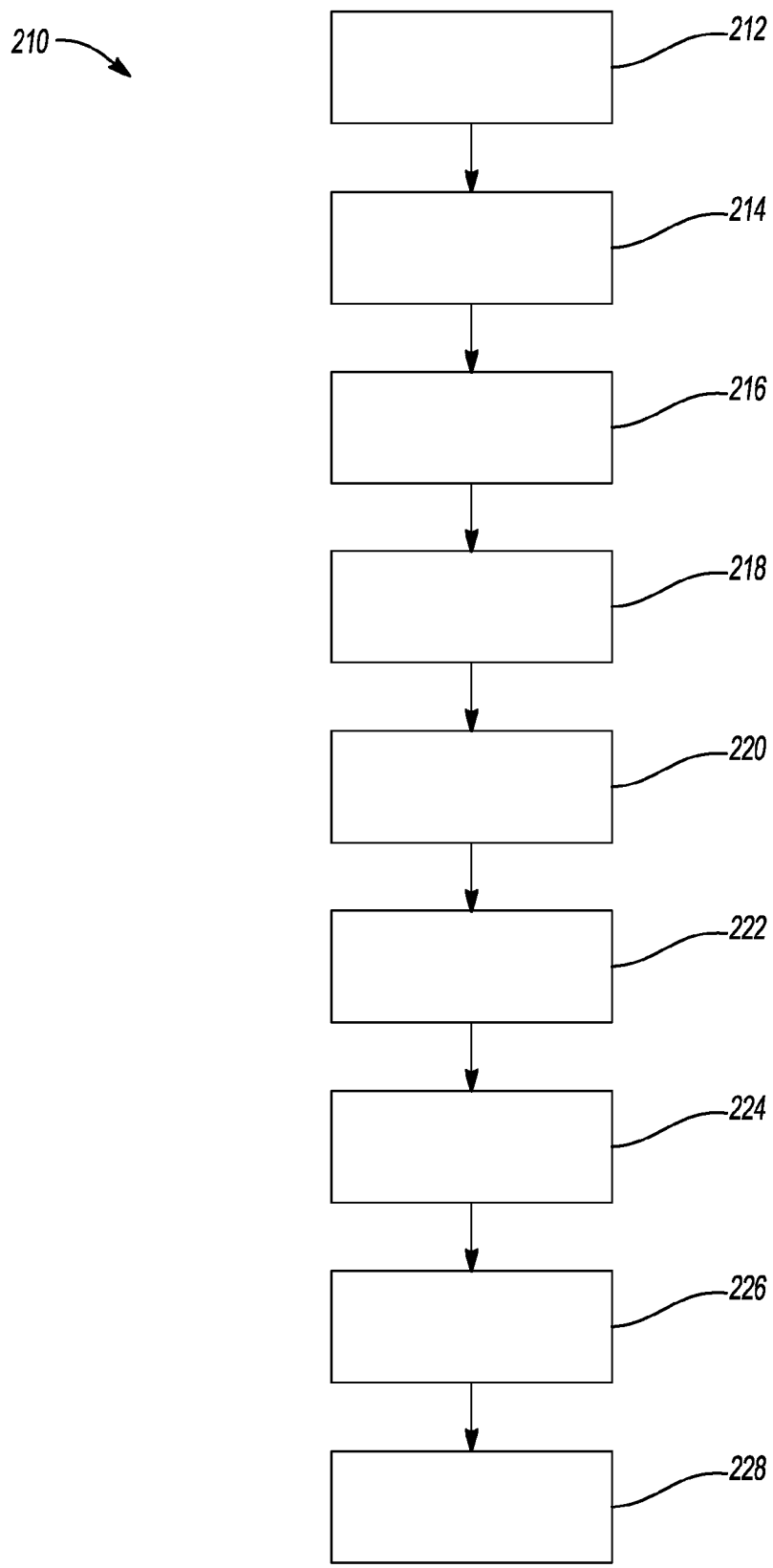
FIG. 5 is a flowchart of another method of active end-turn cooling of the motor in FIGS. 1A-1D.

In accordance with another example of the present disclosure, FIG. 5 depicts a method 210 of active end-turn cooling of an electric motor such as an interior permanent magnet motor of a vehicle. Preferably, the method 210 is implemented by the system of FIGS. 1A-1D. As shown, the method 210 comprises in box 212 providing a motor 12 comprising a rotary shaft 16 connected to a rotor 18 and a stator unit 20 comprising conductive windings 24 arranged about the rotor 18. The windings 24 have a straight portion 26 radially extending to an end-turn portion 30 having a target area 31.

As shown in FIGS. 1A-1D, the motor 12 further comprises an oil sump 44 disposed above the stator unit 20. The oil sump 44 comprises a reservoir 46 having an inner side 48 for containment of coolant and an outer side 50 arranged above the end-turn portion 30. The reservoir 46 has at least one aperture 52 formed therethrough over the target area 31 of the end-turn portion 30.

In this example, the motor 12 further comprises a movable nozzle 54 having a first open end 56 extending to a second open end 58. The first open end 56 connected to the at least one aperture 52 such that the movable nozzle 54 and reservoir 46 are in fluid communication. The second open end 58 extending from the at least one aperture 52 and positioned adjacently above the target area 31 of the end turn portion 30 for coolant distribution. The motor 12 further comprises at least one of the connectors 60, 62 movably disposed proximate to the movable nozzle 58.

As shown, the motor 12 comprises a cam 64 in movable contact with the moveable nozzle 54. The cam 64 is moveably arranged to move the second open end 58 of the nozzle 54 over the target area 31 of the end turn portion 30 for distribution of coolant from the oil sump 44.

Referring to FIG. 5, the method 210 further comprises in box 214 measuring vehicle speed, vehicle lateral acceleration, and road tilt angle of coolant due to road tilt of the vehicle.

As shown in FIG. 5, the method 210 further comprises in box 216 calculating a coolant angle, a coolant acceleration angle and a first coolant distance based on the lateral acceleration if the speed of the vehicle is greater than zero. The coolant angle is defined as a first angle of coolant drops at the end-turn 30 relative to the second end 58. The coolant acceleration angle is defined as an angle caused by the gravity and the lateral acceleration. The first coolant distance is a first distance of coolant drops relative to the target area 31 due to lateral acceleration and road tilt angle.

In one example, the step of calculating the coolant acceleration angle and the first coolant distance comprises applying $$\theta_{lat} = \tan^{-1}\left(\frac{a_{lat}}{g}\right)$$

and $$m = l\tan(\theta) = l\tan(\theta_{tilt} + \theta_{lat})$$

where $\theta_{lat}$ is coolant acceleration angle, $\theta_{tilt}$ is road tilt angle, $\theta$ is coolant angle ($\theta = \theta_{tilt} + \theta_{lat}$), $a_{lat}$ is lateral acceleration, g is gravity constant, and m is the first coolant distance.

In this example, the method 210 further comprises in box 218 comparing the acceleration angle with a critical angle. The critical angle is a maximum angle that coolant drops within the target area 31 relative to the second end 58. Preferably, the critical angle is represented by:

$$\theta_{crit} = \tan^{-1}\left(\frac{r}{l}\right)$$

where, $\theta_{crit}$ is the maximum angle that coolant drops within the target area, l is distance between the second end 58 of the nozzle 54 and the end-turn 30, and r is radius of the target area 31.

The method 210 further comprises in box 220 calculating a first control angle based on the road tilt angle and the lateral acceleration of the vehicle if the acceleration angle is greater than the critical angle. Preferably, the step of calculating the first control angle comprises applying $$m : l = L\sin(\theta_{ctrl}) : L(1 - \cos(\theta_{ctrl})) + l$$

to provide $$m(L(1 - \cos(\theta_{ctrl})) + l) = lL\sin(\theta_{ctrl})$$

and $$\theta_{ctrl} = 2\left(\tan^{-1}\left(\frac{lL - \sqrt{l(lL^2 - lm^2 - 2Lm^2)}}{lm + 2Lm}\right)\right)$$

where, L is length of the moveable nozzle 54, l is distance between the second end 58 of the nozzle 54 and the end-turn 30, m is coolant traveled distance or first coolant distance by the lateral acceleration and the road tilt angle, and r is radius of the target area 31.

The method 210 further comprises in box 222 comparing the road tilt angle with the critical angle if the speed of the vehicle is zero. The road tilt angle is defined as a second angle of coolant drops at the end turn 30 relative to the second end 58.

The method 210 further comprises in box 224 calculating a second control angle and a second coolant distance based on the road tilt angle of the vehicle if the road tilt angle is greater than the critical angle. The second coolant distance is a second distance of coolant drops relative to the target area due to road tilt. Preferably, the step of calculating the second control angle comprises applying $$m : l = L\sin(\theta_{ctrl}) : L(1 - \cos(\theta_{ctrl})) + l$$

to provide $$m(L(1 - \cos(\theta_{ctrl})) + l) = lL\sin(\theta_{ctrl})$$

and $$\theta_{ctrl} = 2\left(\tan^{-1}\left(\frac{lL - \sqrt{l(lL^2 - lm^2 - 2Lm^2)}}{lm + 2Lm}\right)\right)$$

where L is length of the moveable nozzle 54, l is distance between the second end 58 of the nozzle 54 and the end-turn 30, m is coolant traveled distance or the second coolant distance by the road tilt angle, and r is radius of the target area 31.

In this example, the method 210 further comprises in box 226 determining a cam position based on one of the first control angle and the second control angle. The cam position is a position at which the cam is arranged to move the second open end 58 of the nozzle 54 to compensate for one of the lateral acceleration and the road tilt angle of the vehicle such that the coolant drops within the target area 31 of the end-turn 30.

The method 210 further comprises in box 228 moving the connectors 60, 62 and cams 64 to the position to move the second open end 58 and compensate for one of the lateral acceleration and the road tilt angle of the vehicle such that the coolant drops within the target area 31 of the end-turn 30.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:
1. A method of active end-turn cooling of an electric motor of a vehicle, the method comprising:
  providing a motor comprising:
    a rotary shaft connected to a rotor;
    a stator unit comprising conductive windings arranged about the rotor, the windings having a straight portion radially extending to an end-turn portion having a target area;
    an oil sump disposed above the stator unit, the oil sump comprising a reservoir having an inner side for containment of coolant and an outer side arranged above the end-turn portion, the reservoir having at least one aperture formed therethrough over the target area of the end-turn portion;
    a movable nozzle having a first open end extending to a second open end, the first open end connected to the at least one aperture such that the movable nozzle and reservoir are in fluid communication, the second open end extending from the at least one aperture and positioned adjacently above the target area of the end turn portion for coolant distribution;
    a cam being in movable contact with the moveable nozzle, the cam being moveably arranged to move the second open end of the nozzle over the target area of the end turn portion for distribution of coolant from the oil sump to the end turn portion;
  measuring vehicle speed, vehicle lateral acceleration, and road tilt angle of coolant due to road tilt of the vehicle;
  if the speed of the vehicle is greater than zero, calculating coolant angle, coolant acceleration angle based on the lateral acceleration and the road tilt angle, the coolant angle being defined as a first angle of coolant drops at the end-turn relative to the second end;
  comparing the coolant angle with a critical angle being a maximum angle that coolant drops within the target area relative to the second end;
  if the coolant angle is greater than the critical angle, calculating a first control angle and a first coolant distance based on the road tilt angle and the lateral acceleration of the vehicle, the first coolant distance being a first distance of coolant drops relative to the target area due to road tilt angle and lateral acceleration;
  determining a cam position based on the first control angle, the cam position being a position at which the cam is arranged to move the second open end of the nozzle to compensate for the lateral acceleration of the vehicle such that the coolant drops within the target area of the end-turn;
  moving the cam to the position to move the second open end and compensate for the lateral acceleration of the vehicle such that the coolant drops within the target area of the end-turn.

2. The method of claim 1 wherein calculating the coolant acceleration angle and the first coolant distance comprises applying $$\theta_{lat} = \tan^{-1}\left(\frac{a_{lat}}{g}\right)$$

and $$m = l\tan(\theta) = l\tan(\theta_{lat} + \theta_{tilt})$$

where $\theta_{lat}$ is coolant acceleration angle, $\theta_{tilt}$ is road tilt angle, $\theta$ is coolant angle ($\theta = \theta_{tilt} + \theta_{lat}$), $a_{lat}$ is lateral acceleration, g is gravity constant, and m is the first coolant distance.

3. The method of claim 2 wherein calculating the first control angle comprises applying $$m : l = L\sin(\theta_{ctrl}) : L(1 - \cos(\theta_{ctrl})) + l$$

to provide $$m(L(1 - \cos(\theta_{ctrl})) + l) = lL\sin(\theta_{ctrl})$$

and $$\theta_{ctrl} = 2\left(\tan^{-1}\left(\frac{lL - \sqrt{l(lL^2 - lm^2 - 2Lm^2)}}{lm + 2Lm}\right)\right)$$

where,
  L is length of the moveable nozzle, l is distance between the second end of the nozzle and the end-turn, m is coolant traveled distance or first coolant distance by the lateral acceleration and the road tilt angle, and r is radius of the target area.

4. The method of claim 1 further comprising:
  if the speed of the vehicle is zero, comparing the road tilt angle with the critical angle, the road tilt angle being defined as a second angle of coolant drops at the end turn relative to the second end; and
  if the road tilt angle is greater than the critical angle, calculating a second control angle and a second coolant distance based on the road tilt angle of the vehicle, the second coolant distance being a second distance of coolant drops relative to the target area due to road tilt.

5. The method of claim 4 wherein calculating the second control angle comprises applying $$m:l = L\sin(\theta_{ctrl}) : L(1-\cos(\theta_{ctrl})) + l$$

to provide $$m\big(L(1-\cos(\theta_{ctrl})) + l\big) = lL\sin(\theta_{ctrl})$$

and $$\theta_{ctrl} = 2\left(\tan^{-1}\left(\frac{lL - \sqrt{l(lL^2 - lm^2 - 2Lm^2)}}{lm + 2Lm}\right)\right)$$

where
L is length of the moveable nozzle, l is distance between the second end of the nozzle and the end-turn, m is coolant traveled distance or the second coolant distance by the road tilt angle, and r is radius of the target area.

6. The method of claim 5 further comprising:
determining a cam position based on the second control angle, the cam position being a position at which the cam is arranged to move the second open end of the nozzle to compensate for the road tilt angle such that the coolant drops within the target area of the end-turn.

7. The method of claim 6 further comprising:
moving the cam to the position to move the second open end and compensate for the road tilt angle such that the coolant drops within the target area of the end-turn.

8. The method of claim 1 wherein the critical angle is the maximum angle that coolant drops within the target area, the critical angle being represented by $$\theta_{crit} = \tan^{-1}\left(\frac{r}{l}\right)$$

where,
$\theta_{crit}$ is the maximum angle that coolant drops within the target area, l is distance between the second end of the nozzle and the end-turn, and r is radius of the target area.

9. A system for active end-turn cooling of an electric motor of a vehicle, the system comprising:
a motor comprising:
a rotary shaft connected to a rotor;
a stator unit comprising conductive windings arranged about the rotor, the windings having a straight portion radially extending to an end-turn portion having a target area;
an oil sump disposed above the stator unit, the oil sump comprising a reservoir having an inner side for containment of coolant and an outer side arranged above the end-turn portion, the reservoir having at least one aperture formed therethrough over the target area of the end-turn portion;
a movable nozzle having a first open end extending to a second open end, the first open end connected to the at least one aperture such that the movable nozzle and reservoir are in fluid communication, the second open end extending from the at least one aperture and positioned adjacently above the target area of the end turn portion for coolant distribution;
a connector being movably disposed proximate to the movable nozzle;
a cam being in movable contact with the moveable nozzle, the cam being moveably arranged to move the second open end of the nozzle over the target area of the end turn portion for distribution of coolant from the oil sump to the end turn portion;
an actuator in communication with the connector and arranged to move the connector and the cam to move the second open end such that coolant drops within the target area of the end-turn;
a sensor configured to measure vehicle speed, vehicle lateral acceleration, and road tilt angle of coolant due to road tilt of the vehicle, the sensor being arranged to send a signal of the vehicle speed, vehicle lateral acceleration, and road tilt angle;
a controller in communication with the actuator and configured to control the actuator when the signal is received from the sensor,
wherein the controller being configured to calculate a coolant angle based on the lateral acceleration and the road tilt angle if the speed of the vehicle is greater than zero, the coolant angle being defined as a first angle of coolant drops at the end-turn relative to the second end,
wherein the controller is configured to compare the coolant angle with a critical angle being a maximum angle that coolant drops within the target area relative to the second end,
wherein the controller is configured to calculate a first control angle and a first coolant distance based on the road tilt angle and the lateral acceleration of the vehicle if the acceleration angle is greater than the critical angle, the first coolant distance being a first distance of coolant drops relative to the target area due to lateral acceleration and the road tilt angle,
wherein the controller is configured to determine a cam position based on the first control angle, the cam position being a position at which the cam is arranged to move the second open end of the nozzle to compensate for the road tilt angle and the lateral acceleration of the vehicle such that the coolant drops within the target area of the end-turn,
wherein the controller is configured to control the actuator to move the cam to the position to thereby move the second open end and compensate for the road tilt angle and the lateral acceleration of the vehicle such that the coolant drops within the target area of the end-turn; and
a power source configured to power the actuator, the sensor, and the controller.

10. The system of claim 9 wherein the controller is configured to calculate the coolant acceleration angle and the first coolant distance comprises applying $$\theta_{lat} = \tan^{-1}\left(\frac{a_{lat}}{g}\right)$$

and $$m = l\tan(\theta) = l\tan(\theta_{lat} + \theta_{tilt})$$

where $\theta_{lat}$ is coolant acceleration angle, $\theta_{tilt}$ is road tilt angle, $\theta$ is coolant angle ($\theta = \theta_{tilt} + \theta_{lat}$), $a_{lat}$ is lateral acceleration, g is gravity constant, and m is the first coolant distance.

11. The system of claim 10 wherein the controller is configured to calculate the first control angle comprises applying $$m:l = L\sin(\theta_{ctrl}) : L(1-\cos(\theta_{ctrl}))+l$$

to provide $$m(L(1-\cos(\theta_{ctrl}))+l) = lL\sin(\theta_{ctrl})$$

and $$\theta_{ctrl} = 2\left(\tan^{-1}\left(\frac{lL - \sqrt{l(lL^2 - lm^2 - 2Lm)}}{lm + 2Lm}\right)\right)$$

where,
L is length of the moveable nozzle, l is distance between the second end of the nozzle and the end-turn, m is coolant traveled distance or first coolant distance by the lateral acceleration and the road tilt angle, and r is radius of the target area.

12. The system of claim 9 wherein the controller is configured to compare the road tilt angle with the critical angle if the speed of the vehicle is zero, the road tilt angle being defined as a second angle of coolant drops at the end turn relative to the second end, and
wherein, the controller is configured to calculate a second control angle and a second coolant distance based on the road tilt angle of the vehicle if the road tilt angle is greater than the critical angle, the second coolant distance being a second distance of coolant drops relative to the target area due to road tilt.

13. The system of claim 12 wherein the controller is configured to calculate the second control angle comprises applying $$m:l = L\sin(\theta_{ctrl}) : L(1-\cos(\theta_{ctrl}))+l$$

to provide $$m(L(1-\cos(\theta_{ctrl}))+l) = lL\sin(\theta_{ctrl})$$

and $$\theta_{ctrl} = 2\left(\tan^{-1}\left(\frac{lL - \sqrt{l(lL^2 - lm^2 - 2Lm^2)}}{lm + 2Lm}\right)\right)$$

where
L is length of the moveable nozzle, l is distance between the second end of the nozzle and the end-turn, m is coolant traveled distance or the second coolant distance by the road tilt angle, and r is radius of the target area.

14. The system of claim 13 wherein the controller is configured to determine a cam position based on the second control angle, the cam position being a position at which the cam is arranged to move the second open end of the nozzle to compensate for the road tilt angle such that the coolant drops within the target area of the end-turn.

15. The system of claim 14 wherein the controller is configured to control the actuator to move the cam to the position to move the second open end and compensate for the road tilt angle such that the coolant drops within the target area of the end-turn.

16. The method of claim 9 wherein the critical angle is the maximum angle that coolant drops within the target area, the critical angle being represented by $$\theta_{crit} = \tan^{-1}\left(\frac{r}{l}\right)$$

where,
$\theta_{crit}$ is the maximum angle that coolant drops within the target area, l is distance between the second end of the nozzle and the end-turn, and r is radius of the target area.

17. A method of active end-turn cooling of an electric motor of a vehicle, the method comprising:
providing a motor comprising:
a rotary shaft connected to a rotor;
a stator unit comprising conductive windings arranged about the rotor, the windings having a straight portion radially extending to an end-turn portion having a target area;
an oil sump disposed above the stator unit, the oil sump comprising a reservoir having an inner side for containment of coolant and an outer side arranged above the end-turn portion, the reservoir having at least one aperture formed therethrough over the target area of the end-turn portion;
a movable nozzle having a first open end extending to a second open end, the first open end connected to the at least one aperture such that the movable nozzle and reservoir are in fluid communication, the second open end extending from the at least one aperture and positioned adjacently above the target area of the end turn portion for coolant distribution;
a cam being in movable contact with the moveable nozzle, the cam being moveably arranged to move the second open end of the nozzle over the target area of the end turn portion for distribution of coolant from the oil sump to the end turn portion;
measuring vehicle speed, vehicle lateral acceleration, and road tilt angle of coolant due to road tilt of the vehicle;
if the speed of the vehicle is greater than zero, calculating coolant angle based on the lateral acceleration, the coolant angle being defined as a first angle of coolant drops at the end-turn relative to the second end;
comparing the acceleration angle with a critical angle being a maximum angle that coolant drops within the target area relative to the second end;
if the acceleration angle is greater than the critical angle, calculating a first control angle and a first coolant distance based on the road tilt angle and the lateral acceleration of the vehicle, the first coolant distance being a first distance of coolant drops relative to the target area due to road tilt angle and lateral acceleration
if the speed of the vehicle is zero, comparing the road tilt angle with the critical angle, the road tilt angle being defined as a second angle of coolant drops at the end turn relative to the second end;
if the road tilt angle is greater than the critical angle, calculating a second control angle and a second coolant distance based on the road tilt angle of the vehicle, the second coolant distance being a second distance of coolant drops relative to the target area due to road tilt;
determining a cam position based on one of the first control angle and the second control angle, the cam position being a position at which the cam is arranged to move the second open end of the nozzle to compensate for one of the lateral acceleration and the road tilt angle of the vehicle such that the coolant drops within the target area of the end-turn;

moving the cam to the position to move the second open end and compensate for one of the lateral acceleration and the road tilt angle of the vehicle such that the coolant drops within the target area of the end-turn.

18. The method of claim 17 wherein calculating the coolant acceleration angle and the first coolant distance comprises applying $$\theta_{lat} = \tan^{-1}\left(\frac{a_{lat}}{g}\right)$$

and $$m = l\,tan(\theta) = l\,tan(\theta_{lat} + \theta_{tilt})$$

where $\theta_{lat}$ is coolant acceleration angle, $\theta_{tilt}$ is road tilt angle, $\theta$ is coolant angle ($\theta = \theta_{tilt} + \theta_{lat}$), $a_{lat}$ is lateral acceleration, g is gravity constant, and m is the first coolant distance.

19. The method of claim 18 wherein calculating the first control angle comprises applying $$m:l = Lsin(\theta_{ctrl}):L(1-cos(\theta_{ctrl}))+l$$

to provide $$m\big(L(1-cos(\theta_{ctrl}))+l\big) = lLsin(\theta_{ctrl})$$

and $$\theta_{ctrl} = 2\left(\tan^{-1}\left(\frac{lL - \sqrt{l(lL^2 - lm^2 - 2Lm^2)}}{lm + 2Lm}\right)\right)$$

where,
L is length of the moveable nozzle, l is distance between the second end of the nozzle and the end-turn, m is coolant traveled distance or first coolant distance by the lateral acceleration and the road tilt angle, and r is radius of the target area.

20. The method of claim 17 wherein calculating the second control angle comprises applying $$m:l = Lsin(\theta_{ctrl}):L(1-cos(\theta_{ctrl}))+l$$

to provide $$m\big(L(1-cos(\theta_{ctrl}))+l\big) = lLsin(\theta_{ctrl})$$

and $$\theta_{ctrl} = 2\left(\tan^{-1}\left(\frac{lL - \sqrt{l(lL^2 - lm^2 - 2Lm^2)}}{lm + 2Lm}\right)\right)$$

where
L is length of the moveable nozzle, l is distance between the second end of the nozzle and the end-turn, m is coolant traveled distance or the second coolant distance by the road tilt angle, and r is radius of the target area.

* * * * *